United States Patent [19]

Ito

[11] Patent Number: 4,833,940
[45] Date of Patent: May 30, 1989

[54] CRANKSHAFT FOR A 90 DEGREE V-TYPE EIGHT-CYLINDER INTERNAL COMBUSTION ENGINE

[75] Inventor: Eiji Ito, Nagoya, Japan

[73] Assignee: Toyota Jidosha Kabushiki Kaisha, Aichi, Japan

[21] Appl. No.: 151,198

[22] Filed: Feb. 1, 1988

[30] Foreign Application Priority Data

Feb. 6, 1987 [JP] Japan ............... 62-015638[U]

[51] Int. Cl.$^4$ .................................. F16C 3/04
[52] U.S. Cl. ..................... 74/595; 74/603; 74/604; 123/192 R; 123/192 B
[58] Field of Search ............... 74/603, 604, 595, 596, 74/597; 123/192 B, 192 R, 55 VE, 55 VS, 90.27, 90.31; 27/6

[56] References Cited

U.S. PATENT DOCUMENTS

| 4,002,087 | 1/1977 | Ferrand ............... 74/595 |
| 4,351,202 | 9/1982 | Summers ............ 74/595 X |
| 4,519,344 | 5/1985 | Ohyama et al. ......... 74/603 |
| 4,552,104 | 11/1985 | Hara et al. ......... 123/192 R |
| 4,565,169 | 1/1986 | Suzuki ............... 74/603 |
| 4,569,316 | 2/1986 | Suzuki ............ 123/192 R |
| 4,644,916 | 2/1987 | Kitagawa ......... 123/192 B |
| 4,730,512 | 3/1988 | Ito et al. ......... 123/192 R X |

FOREIGN PATENT DOCUMENTS

| 151118 | 4/1953 | Australia ............... 74/604 |
| 217244 | 9/1961 | Austria ............ 123/192 B |
| 819193 | 10/1937 | France ............... 74/604 |
| 47-29106 | 4/1971 | Japan ............... 74/597 |
| 52-32405 | 11/1977 | Japan ............... 74/597 |
| 57-107453 | 3/1982 | Japan ............... 74/597 |
| 59-27463 | 5/1984 | Japan ............... 74/597 |
| 60-65935 | 4/1985 | Japan ............... 74/604 |
| 61-48629 | 3/1986 | Japan ............... 74/604 |
| 2092235 | 8/1982 | United Kingdom ......... 74/603 |

Primary Examiner—Richard E. Moore
Assistant Examiner—Vinh Luong
Attorney, Agent, or Firm—Oliff & Berridge

[57] ABSTRACT

A crankshaft for a 90° V-type eight-cylinder internal combustion engine having eight balance weights of No. 1 through No. 8 balance weights and supported by five supports. An angle defined between the No. 1 and No. 2 balance weights is set at the range of 15°–45° and an angle defined between the No. 1 and No. 3 balance weights is set at the range of 45°–75°. The mass of each of No. 1 and No. 8 balance weights is greater than the weight of any one of No. 2 through No. 7 balance weights. These relationships can reduce the weight of a crankshaft and bearing loads.

6 Claims, 6 Drawing Sheets

CRANKSHAFT FOR A 90 DEGREE V-TYPE EIGHT-CYLINDER INTERNAL COMBUSTION ENGINE

BACKGROUND OF THE INVENTION

1. Field of the Invention:

The present invention is directed to a crankshaft which is supported by five supports and has eight balance weights for an eight-cylinder internal combustion engine, wherein the eight cylinders comprise two sets of four cylinders which define a V-angle of 90° therebetween (which will be called a 90° V-type eight-cylinder internal combustion engine hereinafter) and, more particularly, is directed to relationships in arrangement and in weight between the eight balance weights of the crankshaft.

2. Description of Related Art:

Relationships in arrangement between balance weights of a prior art crankshaft for a 90° V-type internal combustion engine is disclosed in Japanese Utility Model Publication SHO 47-29106 and Japanese Patent Publication SHO 59-27463.

Figure 11:
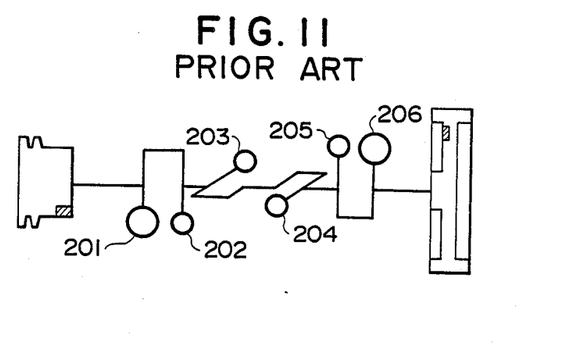
FIG. 11 is a side view of another prior art crankshaft corresponding to Japanese Utility Model Publication SHO 47-29106.

FIG. 11 illustrates the arrangement of the eight balance weights disclosed in Japanese Utility Model Publication SHO 47-29106 where each balance weight 201, 202, 203, 204, 205, 206 is arranged in a 0° or 90° position as viewed from the fore end of the crankshaft.

Figure 10:
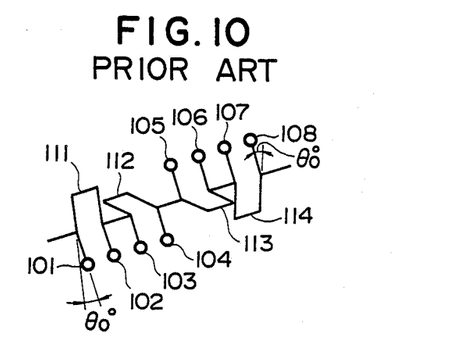
FIG. 10 is an oblique view of a prior art crankshaft corresponding to Japanese Patent Publication SHO 59-27463.

FIG. 10 illustrates the arrangement of the balance weights disclosed in Japanese Patent Publication SHO 59-27463 where the No. 1 through No. 4 balance weights 101, 102, 103 and 104 are offset by $\theta_0°$ in the counter clockwise direction from the No. 4 pin 114 positioned at the lowermost position as viewed from the fore end of the crankshaft and the No. 5 through No. 8 balance weights 105, 106, 107 and 108 are offset by $\theta_0°$ in the counter clockwise direction from the No. 1 pin 111 positioned at the uppermost position as viewed from the fore end of the crankshaft.

Figure 8:
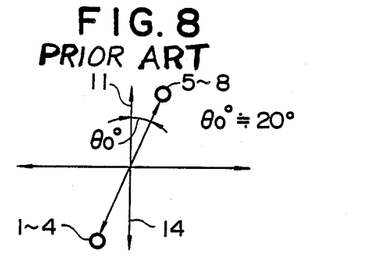
FIG. 8 is an arrangement of balance weights which is effective to make the weight of the balance weights as small as possible.

Generally, for the purpose of making balance weights as small as possible, it is theoretically known that the balance weights of a crankshaft having eight balance weights should be arranged as shown in FIG. 8 so as to eliminate the primary couple of inertial forces. In FIG. 8, the No. 1 through No. 4 balance weights 1, 2, 3 and 4 are offset by $\theta_0°$ ($\theta_0°$ is about 20°) in the clockwise direction from the No. 4 pin 14 which connects the No. 7 and No. 8 balance weights and which is positioned at the lowermost position as viewed from the fore end of the crankshaft, and the No. 5 through No. 8 balance weights 5, 6, 7 and 8 are offset by $\theta_0°$ in the clockwise direction from the No. 1 pin 11 which connects the No. 1 and No. 2 balance weights and which is positioned at the uppermost position as viewed from the fore end of the crankshaft. Further, No. 2 and No. 3 pins 12 and 13 (not shown) are positioned at 90° in the clockwise direction from the No. 8 and No. 1 balance weights, respectively. Though these arrangements of FIG. 8 are different from those of Japanese Patent Publication SHO 59-27463 in direction and amount of offsetting of the balance weights, the technical idea included therein is similar to that of Japanese Patent Publication SHO 59-7463.

However, in the arrangement of FIG. 8, there is a drawback that the bearing loads of the No. 2 journal connecting the No. 2 and No. 3 balance weights and the No. 4 journal connecting the No. 6 and No. 7 balance weights become as large as about twice those of the No. 1, (No. 3,) and No. 5 journals and there is a fear that sticking may occur at the No. 2 and No. 4 journals. Such sticking will occur in the balance weight arrangement of Japanese Patent Publication SHO 59-27463.

Figure 9:
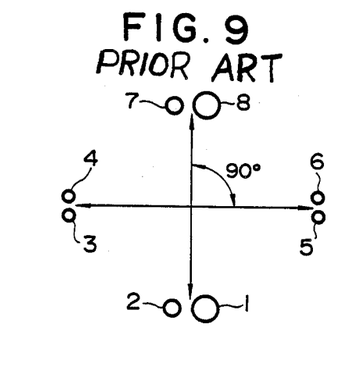
FIG. 9 is an arrangement of balance weights which is effective to make bearing loads as small as possible.

For the purpose of making bearing loads small by making the loads uniform, there is a necessity of making a crankshaft assembly (including a crankshaft, a piston, a connecting rod, a bearing metal and a piston pin) itself highly balanced. Balance weights are provided to eliminate a couple of inertial forces which are generated due to a rotational mass and a reciprocational mass. Therefore, for the purpose of balancing a crankshaft assembly, it is effective that the balance weights are arranged at the positions just opposite the pistons as shown in FIG. 9. This arrangement of the balance weights of FIG. 9 correspond to that of FIG. 11 of Japanese Utility Model Publication SHO 47-29106.

However, in the arrangement of balance weights of FIG. 9, it is required to make the mass weight of each of the No. 1 and No. 8 balance weights greater than any one of the No. 2 through No. 7 balance weights to obtain effective balancing. This results in over balancing of the crankshaft assembly in the directions of the No. 1 and No. 4 pins as well as an excessive increase in the weight of the crankshaft.

SUMMARY OF THE INVENTION

An object of the present invention is to provide a crankshaft for a 90° V-type eight-cylinder internal combustion engine having a weight which is as small as possible and which enables the bearing loads to remain as small as possible.

The above object is achieved by the following crankshaft according to the present invention;

A crankshaft for a 90° V-type eight-cylinder internal combustion engine supported by five supports, the crankshaft including eight balance weights comprising No. 1 through No. 8 balance weights, four pins comprising a No. 1 pin connecting the No. 1 and No. 2 balance weights, a No. 2 pin connecting the No. 3 and No. 4 balance weights, a No. 3 pin connecting the No. 5 and No. 6 balance weights, and a No. 4 pin connecting the No. 7 and No. 8 balance weights, and five journals comprising No. 1 through No. 5 journals, the balance weights being arranged in the order of the No. 1 to No. 8 balance weights in the direction from a fore end to a rear end of the crankshaft, wherein (a) the No. 1, No. 2, No. 3 and No. 4 balance weights are offset by 180° in angular phase from the No. 8, No. 7, No. 6 and No. 5 balance weights, respectively, (b) an angle $\theta_1°$ defined between the No. 1 and No. 2 balance weights and an angle $\theta_2°$ defined between the No. 1 and No. 3 balance weights being set in the following angular range:

$$15° \leq \theta_1° \leq 45°, \text{ and}$$

$$45° \leq \theta_2° \leq 75°, \text{ and}$$

(c) a weight of each of the No. 1 and No. 8 balance weights being greater than a weight of any one of the No. 2 through No. 7 balance weights.

In the above crankshaft according to the present invention, since the No. 2 and No. 3 balance weights are offset by $\theta_1°$ and $\theta_2°$ from the No. 1 balance weight, respectively, and the No. 7 and No. 6 balance weights are offset by $\theta_1°$ and $\theta_2°$ from the No. 8 balance weight, respectively, the total weight of the balance weights of the crankshaft of the present invention is much smaller than that of the balance weights of the crankshaft of FIG. 9 where all balance weights are arranged at a 0° or 90° position. This means that the arrangement of the balance weights according to the present invention approaches the arrangement of the balance weights of FIG. 8 which is an ideal arrangement merely from the view point of weight reduction. Accordingly, the weight of the crankshaft of the present invention is effectively decreased.

However, if the offset angles $\theta_1°$ and $\theta_2°$ were set at 20° as shown in FIG. 8, the bearing loads of the No. 2 and No. 4 bearings would become excessively large as illustrated heretofore. For the purpose of reducing the bearing loads of all bearings including the No. 2 and No. 4 journals, bearing loads at all supports were calculated using the three-moment theorem of Clapeyron, varying angles $\theta_1°$ and $\theta_2°$ and the weight of the balance weights, so that desirable relationships were obtained between offset angles and weights between the eight balance weights, such that the bearing loads at the No. 2 and No. 4 journals were effectively reduced. The desirable ranges of offset angles and weight thus obtained are those defined above in accordance with the present invention. Therefore, according to the present invention, the bearing loads at the No. 2 and No. 4 journals are smaller and all the bearing loads are made more uniform than in a conventional crankshaft.

As a result, according to the present invention, the weight of the crankshaft and the bearing loads at the journals can be reduced.

BRIEF DESCRIPTION OF THE DRAWINGS

The above and other objects, features and advantages of the present invention will become apparent and more readily appreciated from the following detailed description of the preferred exemplary embodiments of the invention taken in conjunction with the accompanying drawings, in which.

DETAILED DESCRIPTION OF THE PREFERRED EMBODIMENTS

Figure 2:
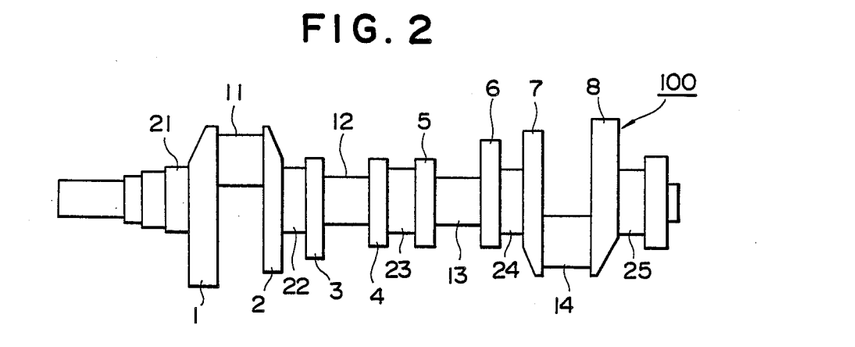
FIG. 2 is a side view of the crankshaft according to the present invention.

FIG. 2 illustrates a crankshaft 100 for a 90° V-type eight-cylinder internal combustion engine supported by five supports. Crankshaft 100 includes eight balance weights comprising No. 1 through No. 8 balance weights 1, 2, 3, 4, 5, 6, 7 and 8, respectively. No. 1 through No. 8 balance weights 1, 2, 3, 4, 5, 6, 7 and 8 are arranged in the order of the balance weights 1, 2, 3, 4, 5, 6, 7 and 8 from a fore end to a rear end of crankshaft 100. Crankshaft 100 also includes four pins comprising No. 1 through No. 4 pins 11, 12, 13 and 14, respectively. No. 1 pin 11 connects No. 1 and No. 2 balance weights 1 and 2; No. 2 pin 12 connects No. 3 and No. 4 balance weights 3 and 4; No. 3 pin 13 connects No. 5 and No. 6 balance weights 5 and 6; and No. 4 pin 14 connects No. 7 and No. 8 balance weights 7 and 8. No. 1 pin 11 is connected to a connecting rod of a No. 1 cylinder and a connecting rod of a No. 2 cylinder; No. 2 pin 12 is connected to a connecting rod of a No. 3 cylinder and a connecting rod of a No. 4 cylinder; No. 3 pin 13 is connected to a connecting rod of a No. 5 cylinder and a connecting rod of a No. 6 cylinder; and No. 4 pin 14 is connected to a connecting rod of a No. 7 cylinder and a connecting rod of a No. 8 cylinder. Crankshaft 100 includes five journals comprising No. 1 through No. 5 journals 21, 22, 23, 24 and 25, respectively, and crankshaft 100 is supported by five supports at the journals 21, 22, 23, 24 and 25. No. 1 through No. 5 journals 21 through 25 are arranged in the order of the journal 21, 22, 23, 24 and 25 from the fore end to the rear end of crankshaft 100. No. 2 journal 22 connects No. 2 and No. 3 balance weights 2 and 3; No. 3 journal 23 connects No. 4 and No. 5 balance weights 4 and 5; and No. 4 journal 24 connects No. 6 and No. 7 balance weights 6 and 7. Gravity centers of No. 1, No. 4, No. 5 and No. 8 balance weights 1, 4, 5 and 8 are radially offset from a rotational axis of crankshaft 100 in the same side as No. 4, No. 3, No. 2 and No. 1 pins 14, 13, 12 and 11, respectively.

Figure 1:
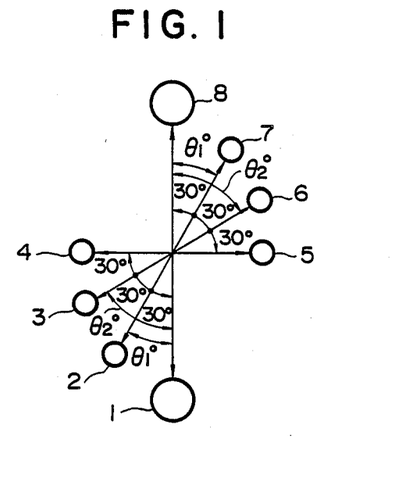
FIG. 1 is a one vector-arrangement of eight balance weights of a crankshaft as viewed from a fore end of a crankshaft for a 90° V-type eight-cylinder internal combustion engine supported by five supports according to the present invention.

FIG. 1 illustrates one vector-arrangement of the eight balance weights as viewed from the fore end of the crankshaft according to the present invention. No. 1, No. 2, No. 3 and No. 4 balance weights 1, 2, 3 and 4 are offset by 180° in angular phase from No. 8, No. 7, No. 6 and No. 5 balance weights 8, 7, 6 and 5, respectively. An angle $\theta_1°$ defined between No. 1 and No. 2 balance weights 1 and 2 and an angle $\theta_2°$ defined between No. 1 and No. 3 balance weights 1 and 3 are set at angles included in the following angular range:

$$15° \leq \theta_1° \leq 45°, \text{ and}$$

$$45° \leq \theta_2° \leq 75°.$$

Preferably, the angles $\theta_1°$ and $\theta_2°$ satisfy the following relationship:

$$\theta_1° + \theta_2° \geq 80°.$$

More preferably, the sum of angles $\theta_1°$ and $\theta_2°$ is equal to 90°. Most preferably, the angles $\theta_1°$ and $\theta_2°$ are set at 30° and 60°, respectively. This arrangement is that shown in FIG. 1.

Reasons why the above-defined ranges and relationships are necessary will be explained below using a calculation based on the three-moment theorem of Clapeyron.

Figure 3:
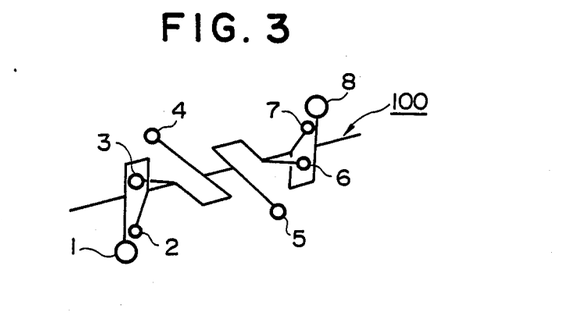
FIG. 3 is an oblique view of a beam model of the crankshaft of FIG. 2 which was used in calculation in accordance with the three-moment theorem of Clapeyron.
Figure 4:
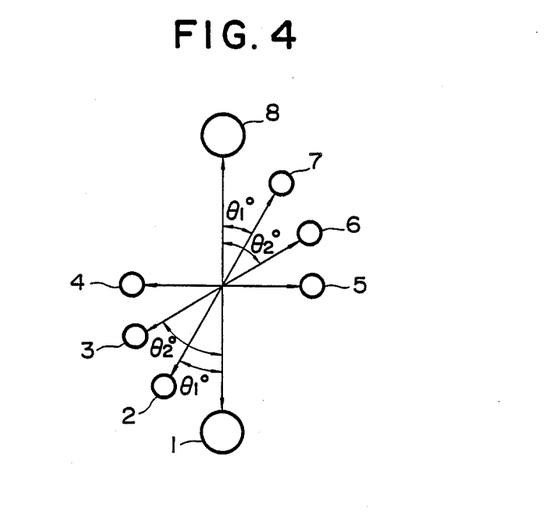
FIG. 4 is an elevational view as viewed from a front end of the beam model of FIG. 3, wherein $\theta_1°$ illustrates an angle defined between No. 1 and No. 2 balance weights and $\theta_2°$ illustrates an angle defined between No. 1 and No. 3 balance weights.

FIGS. 3 and 4 illustrate a beam model which was used in the calculation. In FIG. 3, the mass weight of an arbitrary balance weight is denoted by reference m; an arm length defined between a gravity center of an arbitrary balance weight and the rotational axis of the crankshaft is denoted by reference r; and a distance between an arbitrary balance weight and a longitudinal center of the crankshaft is denoted by reference l. In the calculation, ratios in mass weight m, arm length r and distance l between No. 1 through No. 4 balance weights, 1, 2, 3 and 4 are set as shown in Table 1.

TABLE 1

| | CONDITIONS IN CALCULATION | | | |
|---|---|---|---|---|
| | No. 1 balance weight | No. 2 balance weight | No. 3 balance weight | No. 4 balance weight |
| m | 1.4–1.7 | 1.0 | 1.0 | 1.0 |
| r | 1.1 | 1.0 | 1.0 | 1.0 |
| l | 9.2 | 6.0 | 4.0 | 1.0 |
| m × r × l | 15 (13–17) | 6 | 4 | 1 |

In the calculation, engine speeds were set at 7,000 rpm and a maximum combustion pressure was set at 55 kg/cm².

Figure 7:
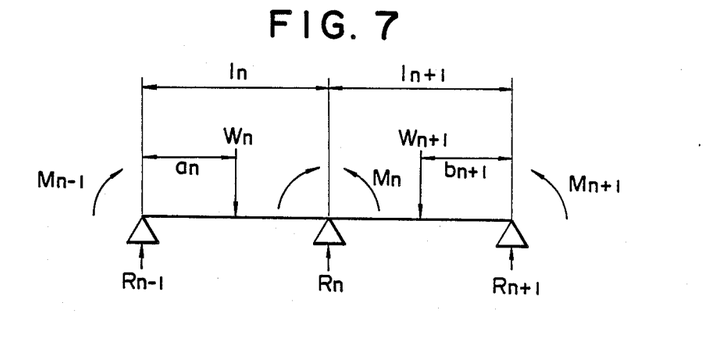
FIG. 7 is a beam model which was used in calculation according to the three-moment theorem of Clapeyron.

The bearing loads were calculated using the three-moment theorem of Clapeyron which itself is a known calculation method. The three-moment equations are as follows using a moment M, a load R at a support point n, and a span l referring to FIG. 7.

$$\frac{l_n \cdot M_{n-1}}{6EIz} + \frac{M_n \cdot (l_n + l_{n+1})}{3EIz} + \frac{l_{n+1} \cdot M_{n+1}}{6EIz} =$$

$$-\frac{a_n(l_n^2 - a_n^2)}{6l_n \cdot EIz} w_n - \frac{b_{n+1}(l_{n+1}^2 - b_{n+1}^2)}{6l_{n+1} \cdot EIz} w_{n+1}$$

$$R_n = \frac{M_{n-1} - M_n}{l_{n-1}}$$

Various cases were calculated in which the arrangements between the eight balance weights were varied. Input data regarding the balance weight arrangements and the calculation results regarding the bearing loads are shown in TABLE 2 below.

TABLE 2

ARRANGEMENTS OF NO. 1 THROUGH NO. 4 BALANCE WEIGHTS AND BEARING LOADS AT NO. 1 THROUGH NO. 5 JOURNALS

| Angle $\theta$ of No. 1-No. 2 -No. 3 -No. 4 balance weights ($\theta°$) | Maximum bearing loads | | | | | Weight of No. 1 balance weight (kg) |
|---|---|---|---|---|---|---|
| | No.1 Journal (kg) | No. 2 Journal (kg) | No. 3 Journal (kg) | No. 4 Journal (kg) | No. 5 Journal (kg) | |
| 0-0-90-90 | 1,265 | 2,514 | 2,285 | 3,856 | 2,791 | 2.791 - X |
| 0-15-75-90 | 1,361 | 2,776 | 2,141 | 3,074 | 1,566 | 2.621 - Δ |
| 0-15-60-90 | 1,204 | 3,016 | 2,141 | 3,355 | 1,419 | 2.459 - X |
| 0-20-20-90 | 1,138 | 3,774 | 2,141 | 4,139 | 1,205 | 2.227 - X |
| 0-20-50-90 | 1,130 | 3,107 | 2,141 | 3,467 | 1,346 | 2.385 - X |
| 0-20-70-90 | 1,344 | 2,739 | 2,141 | 3,057 | 1,531 | 2.588 - O |
| 0-25-45-90 | 1,112 | 3,106 | 2,141 | 3,474 | 1,326 | 2.372 - X |
| 0-25-65-90 | 1,311 | 2,712 | 2,141 | 3,046 | 1,502 | 2.565 - O |
| 0-30-30-90 | 1,052 | 3,333 | 2,141 | 3,708 | 1,257 | 2.309 - X |
| 0-30-60-90 | 1,293 | 2,694 | 2,141 | 3,041 | 1,479 | 2.553 - ⊙ |
| 0-35-50-90 | 1,230 | 2,785 | 2,141 | 3,150 | 1,418 | 2.503 - Δ |
| 0-40-55-90 | 1,323 | 2,577 | 2,141 | 2,932 | 1,497 | 2.611 - Δ |
| 0-40-65-90 | 1,428 | 2,394 | 2,141 | 2,725 | 1,598 | 2.720 - Δ |
| 0-40-70-90 | 1,482 | 2,316 | 2,141 | 2,629 | 1,651 | 2.778 - Δ |
| 0-45-45-90 | 1,267 | 2,681 | 2,141 | 3,046 | 1,446 | 2.579 - O |
| 0-45-75-90 | 1,581 | 2,150 | 2,141 | 2,435 | 1,747 | 2.906 - Δ |
| 0-60-30-90 | 1,280 | 2,725 | 2,141 | 3,074 | 1,467 | 2.687 - Δ |

In TABLE 2, the right column shows judgement from the view point of both bearing loads and mass weight of a crankshaft. In the judgment, if the bearing load of the No. 2 journal is smaller than 2800 Kg, if the bearing load of the No. 4 journal is smaller than 3100 Kg, and if weight of the No. 1 balance weight is smaller than 2.60 Kg, the case is good or allowable and such a case is included in the present invention. In the column, reference ⊙ shows a most preferable case; O shows a good case; Δ shows an allowable case; and × shows a non-allowable case. The cases denoted with references ⊙, O and Δ are included in the present invention. The case of the No. 1-No. 2-No. 3-No. 4 balance weight arrangement of 0°-30°-60°-90° corresponds to FIG. 1; the case of the arrangement of 0°-0°-90°-90° corresponds to FIG. 9; and the case of the arrangement of 0°-20°-20°-90° substantially corresponds to FIG. 8.

Figure 5A:
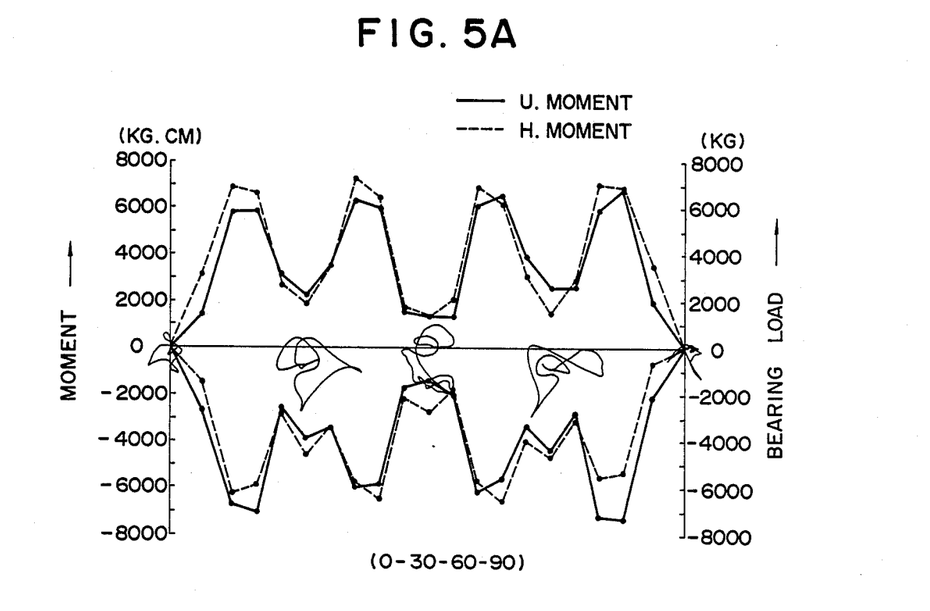
FIG. 5A is a graph illustrating relationships between moments and bearing loads which were obtained in the case of $\theta_1°=30°$ and $\theta_2°=60°$, this case being included in the present invention and corresponding to FIG. 1.
Figure 5B:
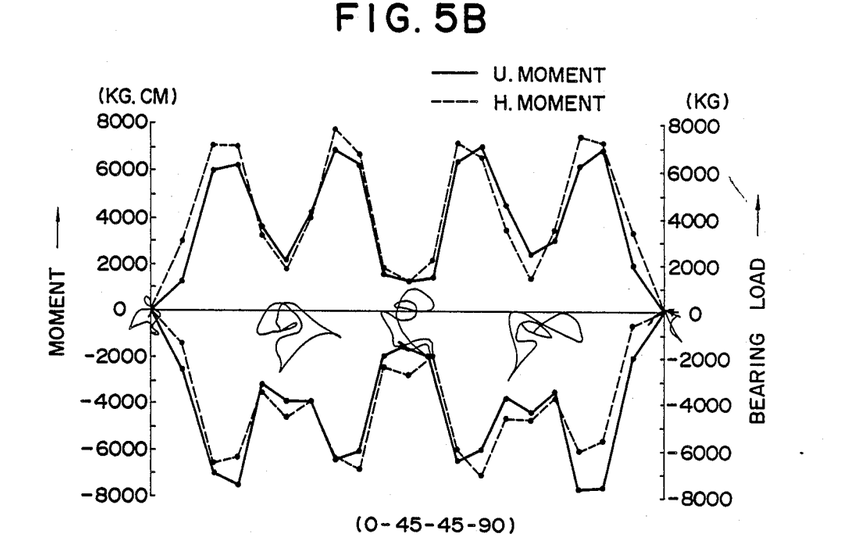
FIG. 5B is a graph illustrating relationships between moments and bearing loads which were obtained in the case of $\theta_1°=45°$ and $\theta_2°45°$, this case being included in the present invention.
Figure 5C:
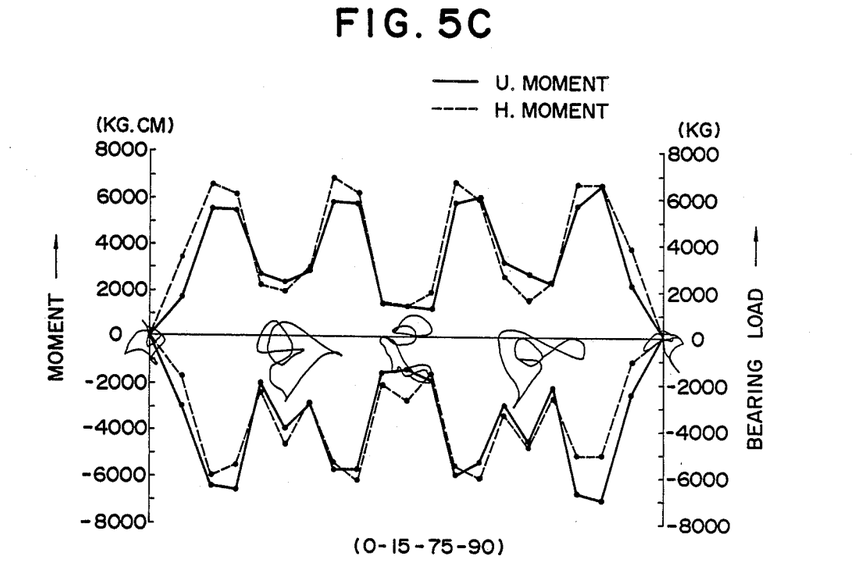
FIG. 5C is a graph illustrating relationships between moments and bearing loads which were obtained in the case of $\theta_1°=15°$ and $\theta_2°75°$, this case being included in the present invention.
Figure 5D:
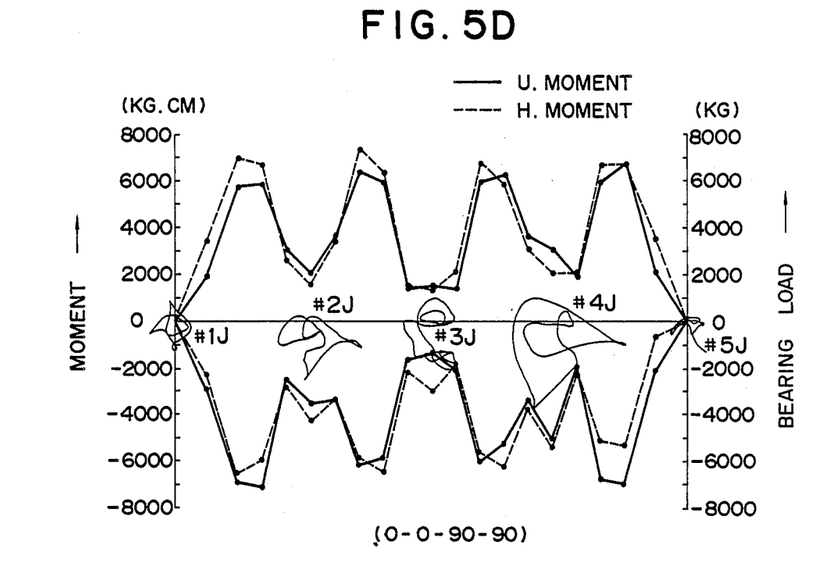
FIG. 5D is a graph illustrating relationships between moments and bearing loads which were obtained in the case of $\theta_1°=0°$ and $\theta_2°=90°$, this case not being included in the present invention and corresponding to FIG. 9.
Figure 5E:
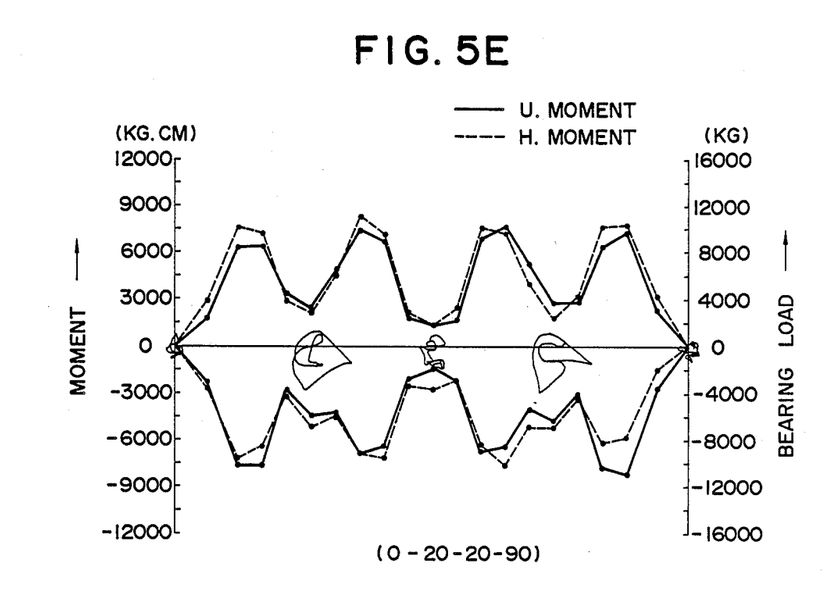
FIG. 5E is a graph illustrating relationships between moments add bearing loads which were obtained in the case of $\theta_1°=0°$ and $\theta_2°=90°$, this case not being included in the present invention and substantially corresponding to FIG. 8.

In TABLE 2, regarding the bearing loads, only the maximum load values are shown, though the loads vary according to rotation of the crankshaft. FIGS. 5A, 5B, 5C, and 5D and 5E illustrate the variances of the bearing loads according to rotation of the crankshaft in the case of several typical examples listed in TABLE 2. FIG. 5A corresponds to the 0°-30°-60°-90° arrangement; FIG. 5B corresponds to the 0°-45°-45°-90° arrangement corresponding to FIG. 1; FIG. 5C corresponds to the 0°-15°-75°-90° arrangement; FIG. 5D corresponds to the 0°-0°-90°-90° arrangement corresponding to FIG. 9; and FIG. 5E corresponds to the 0°-20°-20°-90° arrangement corresponding to FIG. 8. The cases of FIGS. 5A, 5B and 5C are included in the present invention, while the cases of FIGS. 5D and 5E are not included in the present invention.

Figure 6:
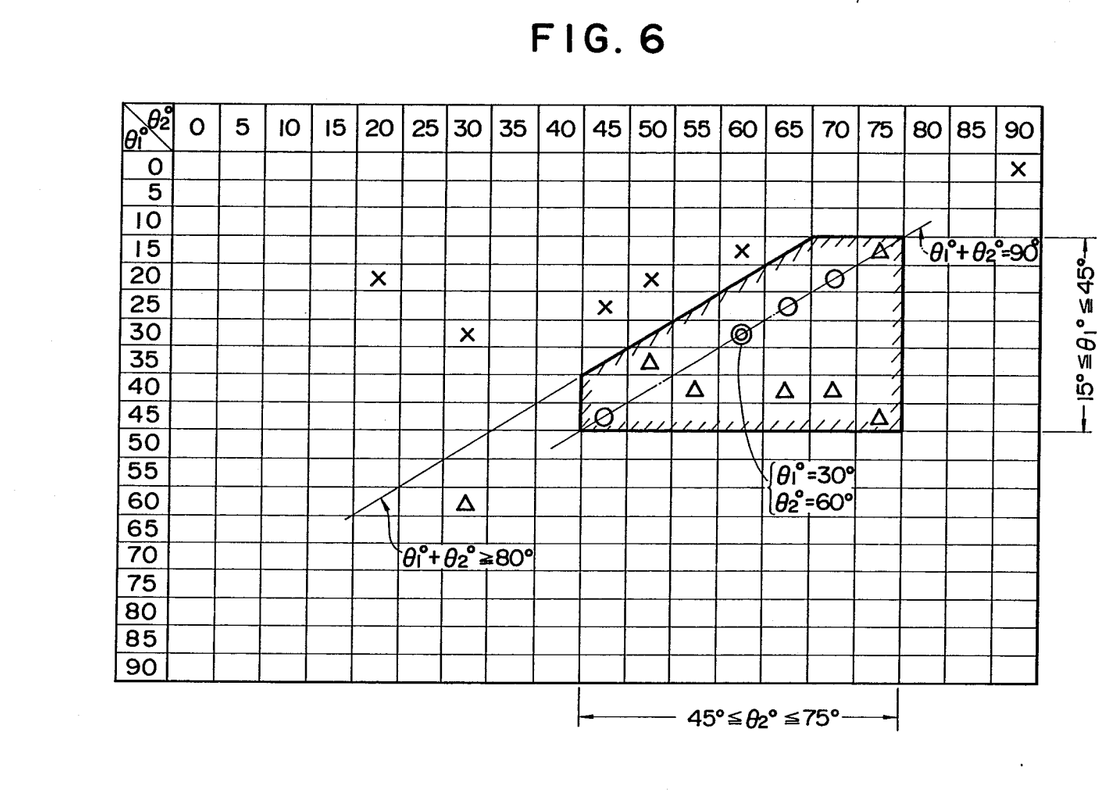
FIG. 6 is a diagram illustrating desirable ranges of the angles $\theta_1°$ and $\theta_2°$ according to the present invention.

FIG. 6 illustrates the results of the calculation shown in TABLE 2 in the form of a diagram. References ⊙, O, Δ and × in FIG. 6 correspond to the references and ⊙, O, Δ and X of TABLE 2, respectively. A hatched region illustrates the region defined by the following relationships:

$$15° \leq \theta_1° \leq 45°,$$

$$45° \leq \theta_2° \leq 75°, \text{ and}$$

$$\theta_1° + \theta_2° \geq 80°.$$

As apparent from FIG. 6, the cases denoted with references ◐ and ○ appears when $\theta_1° + \theta_2°$ is 90°. Accordingly, the relationship of $\theta_1° + \theta_2° = 90°$ is preferable. The case of $\theta_1° = 30°$ and $\theta_2° = 60°$ is most preferable.

According to the present invention, the following effects are obtained.

Firstly, since all the bearing loads including the bearing loads at the No. 2 and No. 4 journals are reduced without increasing the mass weight of the crankshaft, sticking at the bearings can be prevented thorugh an easy oil membrane formation between the journals and the support bearings therefor.

Secondly, due to the reduction of the bearing loads, a load bearing area of the journals can be reduced and thus, the dimension of the crankshaft can also be reduced. Making a crankshaft compact provides an engine which is compact and lightweight. By making a crankshaft compact in length, the rigidity of the crankshaft is increased which suppresses noise during operation of an engine.

Thirdly, due to the reduction of the bearing loads, stresses caused in the crankshaft are reduced, thus increasing the durability of the crankshaft.

While the present invention has been described in its preferred forms, it is to be understood that the invention may be embodied with various changes, modifications and improvements which may occur to those skilled in the art, without departing from the spirit of the invention defined in the appended claims.

What is claimed is:

1. A crankshaft for a 90° V-type eight-cylinder internal combustion engine supported by five supports, said crankshaft including eight balance weights comprising No. 1 through No. 8 balance weights, four pins comprising a No. 1 pin connecting said No. 1 and No. 2 balance weights, a No. 2 pin connecting said No. 3 and No. 4 balance weights, a No. 3 pin connecting said No. 5 and No. 6 balance weights and a No. 4 pin connecting said No. 7 and No. 8 balance weights, and five journals comprising No. 1 through No. 5 journals, said balance weights being arranged in the order of said No. 1 to No. 8 balance weights in a direction from a fore end to a rear end of said crankshaft such that (a) said No. 1, No. 2, No. 3 and No. 4 balance weights are offset by 180° in angular phase from said No. 8, No. 7, No. 6 and No. 5 balance weights, respectively;

(b) an angle $\theta_1°$ defined between said No. 1 and No. 2 balance weights and an angle $\theta_2°$ defined between said No. 1 and No. 3 balance weights are set at angles included in the following angular ranges:

$$15° \leq \theta_1° \leq 45°, \text{ and}$$

$$45° \leq \theta_2° \leq 75°; \text{ and}$$

(c) a weight of each of said No. 1 and No. 8 balance weights is greater than a weight of any one of said No. 2 through No. 7 balance weights.

2. The crankshaft according to claim 1 wherein said angles $\theta_1°$ and $\theta_2°$ further satisfy the following relationship:

$$\theta_1° + \theta_2° \geq 80°.$$

3. The crankshaft according to claim 1 wherein said angles $\theta_1°$ and $\theta_2°$ further satisfy the following relationship:

$$\theta_1° + \theta_2° = 90°.$$

4. The crankshaft according to claim 1 wherein said angles $\theta_1°$ and $\theta_2°$ are set at 30° and 60°, respectively.

5. The crankshaft according to claim 1 wherein said No. 2 and No. 3 balance weights are offset in angular phase in a clockwise direction from said No. 1 balance weight.

6. The crankshaft according to claim 1 wherein gravity centers of said No. 1, No. 4, No. 5 and No. 8 balance weights are radially offset from an axis of said crankshaft in the same directions as said No. 4, No. 3, No. 2 and No. 1 pins, respectively.

* * * * *